Jan. 21, 1969 F. G. J. GRISE 3,422,844
FLEXIBLE CHECK VALVE
Filed March 5, 1965
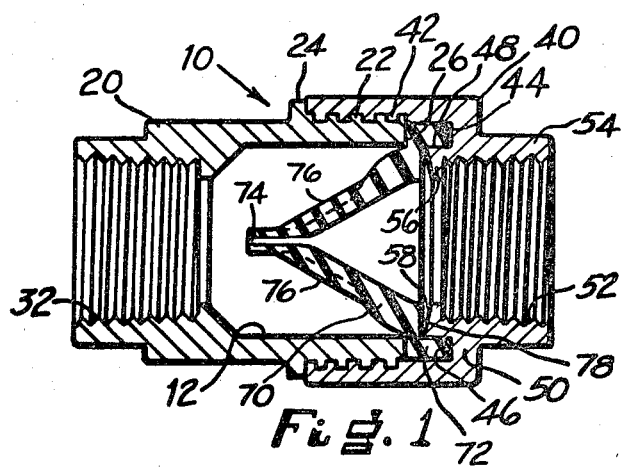
Fig. 1
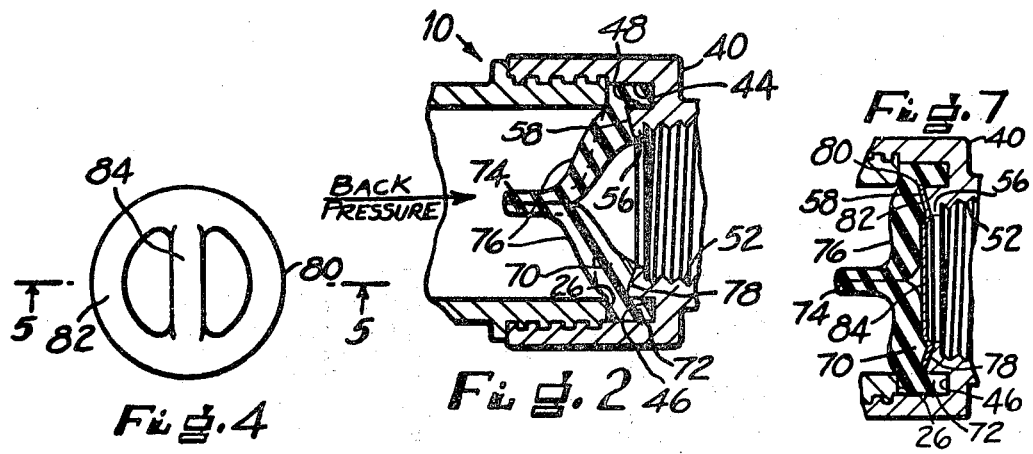
Fig. 4
Fig. 2
Fig. 7
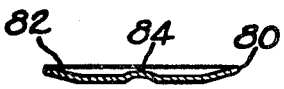
Fig. 5
Fig. 6
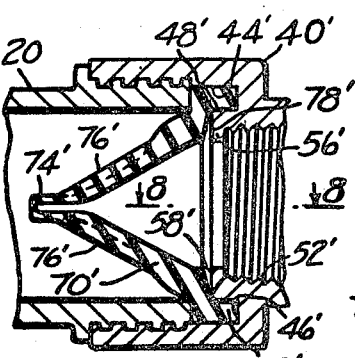
Fig. 3
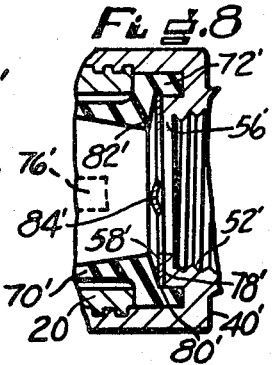
Fig. 8
INVENTOR
FREDERICK G.J. GRISÉ
BY James M. Smith, Jr.
ATTORNEY United States Patent Office 3,422,844
Patented Jan. 21, 1969

3,422,844
FLEXIBLE CHECK VALVE
Frederick G. J. Grise, Barre, Mass., assignor to
Grimar, Inc., Clinton, Mass.
Filed Mar. 5, 1965, Ser. No. 437,463
U.S. Cl. 137—525.1         5 Claims
Int. Cl. F16k 15/14

ABSTRACT OF THE DISCLOSURE

A rigid cylindrical housing including two parts interconnected to support a flexible valve member including a body portion with walls tapered in thickness from a thin flat normally closed end to a thick circular open end and a peripheral supporting collar clamped between the two parts of the housing, and having an annular surface at its open end arranged to be biased under back pressure against an annular surface on the housing to increase the valve member's resistance to back pressure.

---

The present invention relates to an automatic valve, and particularly to a check valve operable to permit the flow of a fluid through a pipe in one direction and to prevent back flow in the other direction.

While check valve assemblies incorporating a flexible valve member as the single operating element are generally well known, their utility has been limited by the physical characteristics of the flexible valve member. A flexible valve member relatively resistant to back pressure can be produced from a relatively hard material and this resistance to back pressure may be increased by adopting a relatively rigid valve member configuration. However, such features result in a flexible valve member not easy to open to permit the flow of fluid in the desired direction, so that it is not suitable for applications in which a large pressure drop across the check valve cannot be tolerated. A flexible valve member produced from a relatively soft material in a configuration readily deformed will permit the flow of fluid in the desired direction with only a very small pressure drop across the check valve. However, a flexible valve member with such features tends to have a relatively low resistance to back pressure insufficient for many applications.

The instant invention contemplates a check valve including an annular housing comprising interconnected male and female elements and also including a flexible valve member secured within and coacting with the respective elements of the annular housing in such a manner that the flexible valve member may be made of a relatively soft material in a configuration readily deformed by the flow of fluid in the desired direction yet be capable of withstanding a relatively high back pressure.

An object of this invention is the provision of a check valve readily installed in a pipe and operable in any attitude in which it is disposed to control the flow of a fluid therethrough.

Another object of this invention is the provision of a check valve including a flexible valve member made from a material generally suitable for use in chemical processes and also for use in hydraulic systems.

Still another object is the provision of a check valve including a flexible valve member of relatively soft material shaped and supported so that it will withstand a relatively high back pressure.

Yet another object of this invention is the provision of a check valve including an annular housing composed of interfitted male and female elements together cooperating to support and constrain the peripheral collar encircling the flexible valve member and in turn sealed thereby.

A further object is the provision of a check valve including an annular housing provided with an integral supplemental supporting surface effective, when the flexible valve member is closed and depressed by back pressure, to support the flexible valve member in a modified configuration with an increased capability to resist back pressure.

A final object of this invention is the provision of a check valve having an annular housing and a flexible valve member so associated that an auxiliary supporting member may be mounted within the annular housing and adjacent to the flexible valve member to further increase the resistance to back pressure of the check valve when it is so equipped.

Other objects and advantages of the present invention will be apparent from the following description and from consideration of the showing in the accompanying drawings, wherein:

FIG. 1 is a longitudinal section taken on the central axis of the preferred embodiment of the instant invention, FIG. 2 is a corresponding partial section of the same embodiment of the instant invention illustrating the manner in which the flexible valve member is deformed by the application of back pressure, FIG. 3 is also a partial section of an arrangement of parts closely resembling the preferred embodiment of the instant invention, but showing an alternative configuration of the supplemental supporting surface of the annular housing and the cooperating surface of the flexible valve member, FIG. 4 is a plan view of the preferred embodiment of an auxiliary supporting member suitable for incorporation in the check valve comprising the instant invention, FIG. 5 is a section on line 5—5 of FIG. 4 showing the dished cross section of the auxiliary supporting member required when it is incorporated in the preferred embodiment of the instant invention shown in FIGS. 1 and 2, FIG. 6 is a section on line 5—5 of FIG. 4 showing the flat cross section of the auxiliary supporting member required when it is incorporated in the slightly modified form of the instant invention shown in FIG. 3, FIG. 7 is a partial section of the preferred embodiment of the instant invention corresponding to that of FIG. 2, but modified to include an auxiliary supporting member so that it illustrates the manner in which the flexible valve member is supported by the auxiliary supporting member shown in FIG. 5 when the flexible valve member is further deformed by increased back pressure, and FIG. 8 is a partial section taken on line 8—8 of FIG. 3 at right angles to the showing in FIG. 3 and modified to include an auxiliary supporting member so that it illustrates the auxiliary supporting member shown in FIG. 6 in operative relation to an annular housing and a flexible valve member with the surface configurations illustrated in FIG. 3.

Referring now to the drawings, wherein like reference numerals identify like or corresponding parts, FIGURE 1 shows the preferred embodiment of a check valve generally designated by the reference numeral 10. As illustrated, check valve 10 consists of an annular housing composed of interconnected tubular elements 20 and 40 and a flexible valve member 70 supported and constrained within the annular housing.

Referring still to FIGURE 1, the generally cylindrical male element 20 is shaped internally over most of its length to form a valve chamber 12 and at one end in the form of internal pipe threads 32 for ready engagement with an adjoining length of pipe with corresponding external threads. At the end remote from the pipe threads 32, the male element is provided with external threads 22 extending along the portion of the outer surface between the external flange 24 and the planar annular end face 26.

Referring once more to FIGURE 1, the generally cylindrical female element 40 is provided at one end with internal threads 42 shaped to threadably engage threads 22 on male element 20 and midway of its length adjacent threads 42 with smooth cylindrical inner surface 44 intersected by the planar annular surface 46 formed on one side of the inwardly extending annular web 50. The female element 40 also includes a concentric relatively smaller diameter portion 54 supported by the annular web 50 and provided with internal pipe threads 52 for ready engagement with an adjoining length of pipe with corresponding external threads. The end of the portion 54 of the female element 40 which is nearest the male element 20 includes an inwardly extending flange 56 forming a supplemental supporting surface consisting of a shallow conical annular surface 58 intersecting a cylindrical outer surface 48 in turn intersecting the planar annular surface 46 of the annular web 50.

Referring again to FIGURE 1, the flexible valve member is molded from a relatively soft and resilient material, such as polyvinyl chloride or silicone rubber or the like, to the shape illustrated including a relatively thick circular base portion with a planar annular surface 78 and a relatively thin flattened tip portion with a slit 74 therethrough extending diametrically of the flexible valve member 70. A collar 72 with a rectangular cross section and offset both radially and longitudinally from the base portion is connected to the flexible valve member as an integral part thereof by means of a relatively narrow section in effect forming a circular hinge line adjacent to the collar 72.

When the respective tubular elements 20 and 40 are threadably interconnected as shown in FIGURE 1, the planar annular end face 26 of the male element 20 and the adjoining surfaces of the female element 40 including cylindrical inner surface 44, planar annular surface 46, and cylindrical outer surface 48 together define within the annular housing an internal reentrant annular recess shaped to receive the collar 72, which performs two functions. First, since it is made slightly oversize longitudinally of the check valve, it is compressed sufficiently within the reentrant annular recess to form an effective fluid seal when the end of the female element 40 engages the flange 24 on male element 20. Second, since the collar 72 is fully enclosed on three sides by the surfaces 26, 44 and 46 and partially enclosed on its fourth side by the surface 48, the flexible valve member 70 of which the collar 72 is an integral part is supported and fully constrained within the annular housing with its planar annular surface 78 positioned adjacent to but spaced angularly from the shallow conical surface 58 of the female element 40.

When fluid pressure is directed against the flexible valve member 70 from the right as seen in FIGURE 1, the tip portion thereof is readily deformed to open the slit 74 wide enough to form a substantially circular outlet opening. The tapered walls of the flexible valve member 70 are so shaped and so supported that they offer very little resistance to this type of deformation which does not require any substantial deformation of the pair of stiffening ribs 76 located on opposite sides of the slit 74 midway of its length and extending longitudinally of the flexible valve member 70 from points near the tip portion to points near the base portion.

When fluid pressure is directed against the flexible valve member 70 from the left as indicated in FIGURE 2 so that it constitutes back pressure, the slit 74 is first closed and sealed tightly by the pressure applied equally on the opposite sides of the tip portion and then the tapered walls are depressed and deflected toward the center of the check valve. As the back pressure increases, the deformation of the tapered walls is accompanied by substantial compression and deformation of the stiffening ribs 76 and by angular displacement of the base portion about the narrow section adjacent to the collar 72 which serves as a circular hinge line so that the planar annular surface 78 is deformed into bearing engagement with the shallow conical surface 58.

The deformation of the flexible valve member 70 in this manner and particularly the angular deflection of the base portion into bearing engagement with the conical surface 58 results in a shallow arcuate configuration bridging the end of the chamber 12 as shown in FIGURE 12 so that a flexible valve member 70 so supported demonstrates relatively high resistance to back pressure.

By way of illustration, a check valve identical to that shown in FIGURE 1, except that the surface 58 was flat and therefore always in engagement with the planar surface 78, withstood a back pressure of only 55 pounds per square inch when it was equipped with a flexible valve member of relatively soft 30 Durometer material, but a check valve constructed exactly as shown in FIGURE 1 including an angle of about 20 degrees between the planar surface 78 and the conical surface 58 withstood a back pressure of 80 pounds per square inch when it was equipped with a flexible valve member 70 of the same relatively soft 30 Durometer material.

Referring now to FIGURE 3, the male element 20, the female element 40', and the flexible valve member 70' are generally of the same configuration as the corresponding parts of the preferred embodiment of the check valve 10 illustrated in FIGURE 1, except for the fact that the annular surface 58' of the female element 40' is a planar surface instead of a shallow conical surface and the fact that the annular surface 78' of the flexible valve member 70' is a shallow conical surface instead of a planar surface.

In this transposition of the shapes of these cooperating annular surfaces, the ability of the check valve 10 to withstand relatively high back pressures with a relatively soft flexible valve member is maintained, because the cooperating annular surfaces 58' and 78' are, in the absence of back pressure on the flexible valve member 70', adjacent to each other only at their outer periphery with an angle therebetween of about twenty degrees measured radially inwardly from the periphery.

From consideration of the embodiments of the check valve 10 illustrated in FIGS. 1 and 3, it will be evident that the desired angular relationship between the cooperating annular surfaces 58 and 78 can also be provided by a pair of shallow conical surfaces oppositely sloped so that the angle therebetween totals about twenty degrees measured radially inwardly from the periphery of such annular surfaces.

Referring now to FIG. 4 and to FIGS. 5 and 6, the relatively high resistance to back pressure of the check valve 10 can be increased very substantially by the addition thereto of an auxiliary supporting member 80 consisting of an annular portion 82 and an elongated narrow rib portion 84 extending diametrically of the annular portion 82, as shown in FIG. 4. The auxiliary supporting member 80 is shaped as shown in FIG. 5 for incorporation in the preferred embodiment of the check valve illustrated in FIG. 1 and as shown in FIG. 6 for incorporation in the form of the check valve 10 illustrated in FIG. 3.

Considering first the preferred embodiment of the auxiliary supporting member 80 illustrated in FIG. 5, the annular portion 82 is dished so that its opposite faces form parallel shallow conical surfaces matching the shallow conical annular surface 58 of the female element 40 and the rib portion 84 is arched for greater resistance to deflection when the back pressure is sufficient to deform the flexible valve member 70 to the extent shown in FIG. 7, in which the auxiliary supporting member is shown with its rib portion 84 aligned with the stiffening ribs 76 and hence perpendicular to a central plane intersecting the slit 74 in the flexible valve member 70.

Considering next the other form of the auxiliary supporting member 80' illustrated in FIG. 6, the annular portion 82' is flat with planar opposite faces matching the planar annular surface 58' of the female element 40' and the rib portion 84' is arched like rib portion 84 for the same reason. In FIG. 8, the auxiliary supporting member 80' is shown in juxtaposition to the surface 58' with the rib portion 84' aligned with the stiffening ribs 76 and hence perpendicular to a central plane intersecting the slit 74.

In either embodiment, the auxiliary supporting member 80 or 80' must be made as thin as possible, so that its presence does not significantly interfere with the rolling displacement of the flexible valve member 70 or 70' as the surface 78 or 78' is rotated about the circular hinge line toward the surface 58 or 58'. Accordingly, the auxiliary supporting member 80 or 80' is made from relatively stiff and strong material such as metal or plastic or the like compatible with and resistant to the fluid to be passed through the check valve 10. For example, in a check valve 10 for installation in a one inch diameter pipe, about the size illustrated in the accompanying drawings, the auxiliary supporting member is preferably no more than one thirty-second of an inch thick. However, it will be obvious that the thickness required to provide the necessary strength will vary as a direct function of the size of the check valve 10.

While only two minor variations in the configuration of the hollow annular member are illustrated in FIGS. 1 and 3, respectively, and elsewhere in the drawings, it will be evident that this configuration can be varied to suit different applications. For example, the hollow annular housing may also serve as a line coupling if the female element 40 is formed in two parts, one corresponding to the relatively smaller diameter portion 54 and the annular web 50 and the other corresponding to the internally threaded cylindrical outer portion, but with an inwardly extending flange overlapping and engaging the outer side of the annular web 50. In such a configuration, the interfitted hollow annular elements together comprising the hollow annular member are still so shaped and arranged that they form an internal reentrant annular recess which receives and secures the collar 72 of the flexible valve member 70.

Thus, the instant invention provides a check valve consisting of a rigid annular housing and a relatively soft flexible valve member respectively so shaped and relatively disposed that the flexible valve member is readily distorted to pass fluid in one direction, but highly resistant to fluid back pressure applied in the opposite direction.

The instant invention also provides a check valve consisting of a rigid annular housing and a relatively soft flexible valve member arranged to cooperate with an auxiliary supporting member to develop increased resistance to fluid back pressure.

The description provided above and the showing in the accompanying drawings are to be considered as exemplary rather than in a limiting sense, since various modifications of this device are contemplated within the scope of the appended claims.

What is claimed is:

1. A check valve comprising a hollow cylindrical rigid housing consisting of first and second interfitted hollow cylindrical elements respectively so shaped and arranged as to form therebetween when fully interfitted a relatively wide annular recess open internally thereof through a relatively narrow opening, and a hollow flexible valve member mounted concentrically within said rigid housing including a flat thin-walled tip portion with a diametrically extending slit therethrough connected by tapered walls to a circular thick-walled base portion also connected to a relatively wide peripheral collar fully radially and partially axially offset from said base portion by a relatively narrow cylindrical section forming a circular hinge means about which the tapered walls interconnecting said base portion and said tip portion of said valve member pivot responsive to fluid pressure differentials across said valve member, the annular recess formed by said first and said second cylindrical elements being of such size and shape as to engage the entire surface of said collar and to seal said collar fluid tight and the annular opening being of such size as to be fully occupied by said narrow cylindrical section.

2. A check valve as described in claim 1, wherein the surface of said collar includes a first pair of spaced concentric cylindrical surfaces and a second pair of spaced parallel flat annular surfaces, said first and said second hollow cylindrical elements respectively include at the cooperating end portions thereof internal and external coacting surfaces together effective to maintain said hollow cylindrical elements fully interfitted, said first hollow cylindrical element includes adjacent the innermost edge of said internal coacting surface a relatively wide internal first cylindrical surface, a first planar annular surface, and a relatively narrow external second cylindrical surface, and said second hollow cylindrical element includes adjacent the outermost edge of said external coacting surface a second planar annular surface, said first and second cylindrical surfaces and said first and second planar annular surfaces together defining the relatively wide annular recess open internally thereof through a relatively narrow annular opening when said first and said second hollow cylindrical elements are fully interfitted.

3. A check valve as described in claim 1, and, in addition, a stop means operative to limit relative displacement of said first and said second hollow cylindrical elements to the amount necessary to fully enclose said collar and to seal said collar fluid tight, said stop means comprising an external circumferential flange fixedly secured to said second hollow cylindrical element for engagement with the adjacent end surface of said first hollow cylindrical element when said first and said second hollow cylindrical elements are fully interfitted.

4. A check valve as described in claim 1, wherein said valve member includes a pair of elongated stiffening ribs located in mutually opposed positions on opposite sides of the diametrically extending slit and extending from adjacent said base portion to adjacent said tip portion thereof, and a first radially inwardly extending annular surface with its periphery coincident radially of said housing with said narrow cylindrical section and adjacent to one edge of said narrow cylindrical section, and said first hollow cylindrical element includes a second radially inwardly extending annular surface with its periphery coincident radially of said housing with said narrow cylindrical section, said second annular surface being contiguous around its periphery to the periphery of said first annular surface and angularly offset radially thereof from said first annular surface a predetermined small angular amount, whereby back pressure applied to said valve member causes the thick-walled base portion thereof to rotate about said narrow cylindrical section to pivot said tapered walls radially inwardly of said housing to further compress and further deform said tapered walls and said stiffening ribs adjacent to the thin-walled tip portion to provide increased resistance to back pressure.

5. A check valve comprising a hollow cylindrical rigid housing, and a hollow flexible valve member mounted concentrically within said rigid housing including a flat thin-walled tip portion with a diametrically extending slit therethrough connected by tapered walls to a circular thick-walled base portion also connected through a relatively narrow cylindrical section to a peripheral supporting means for said valve member secured circumferentially thereof within said rigid housing, said valve member including a first radially inwardly extending annular surface with its periphery coincident radially of said rigid housing with said narrow cylindrical section and adjacent to one edge of said narrow cylindrical section, and said rigid housing including a second radially inwardly extending annular surface with its periphery coincident radially of said rigid housing with said narrow cylindrical section, said second annular surface being contiguous around its periphery to the periphery of said first annular surface and angularly offset radially thereof from said first annular surface a predetermined small amount, whereby back pressure applied to said valve member causes the thick-walled base portion thereof to rotate about said narrow cylindrical section to pivot said tapered walls radially inwardly of said housing to further compress and further deform said tapered walls adjacent to the thin-walled tip portion to provide increased resistance to back pressure.

References Cited

UNITED STATES PATENTS

| | | | |
|---|---|---|---|
| 621,849 | 3/1899 | Rickman | 137—525.1 X |
| 2,328,382 | 8/1943 | Langdon | 137—525.1 X |
| 2,598,002 | 5/1952 | Langdon | 137—525.1 X |
| 2,642,259 | 6/1953 | Catlin | 137—525.1 |
| 2,670,757 | 3/1954 | Delany | 137—525.1 X |
| 2,875,776 | 3/1959 | Skipwith | 137—512.4 X |
| 2,981,276 | 4/1961 | Peras | 137—525.1 X |

WILLIAM F. O'DEA, *Primary Examiner.*

D. J. ZOBKIW, *Assistant Examiner.*

U.S. Cl. X.R.

137—525.3